Nov. 22, 1927.
E. G. HALLQUIST
1,650,069
RAILWAY MOTOR TRUCK
Filed Dec. 30, 1926
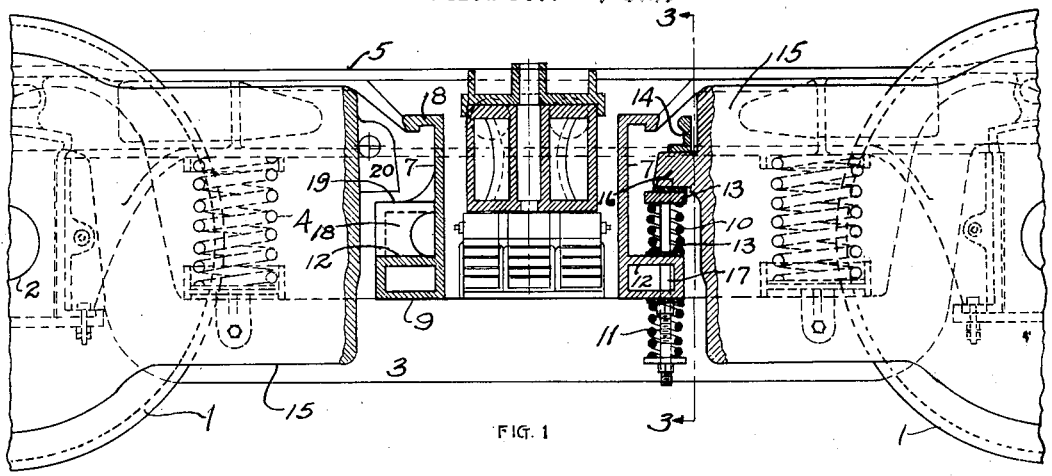
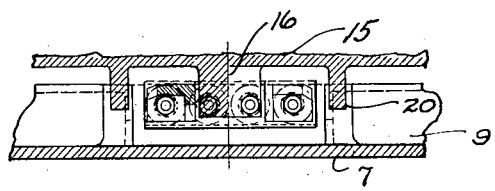
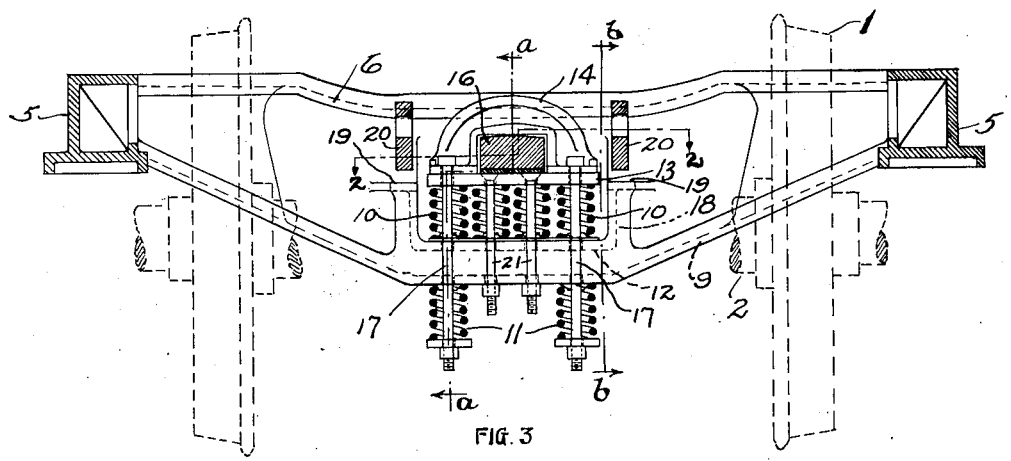
Inventor
Einar G Hallquist
By Cornwall, Bedell & James
Att'ys.

Patented Nov. 22, 1927.

1,650,069

UNITED STATES PATENT OFFICE.

EINAR G. HALLQUIST, OF EDWARDSVILLE, ILLINOIS, ASSIGNOR TO COMMONWEALTH STEEL COMPANY, OF GRANITE CITY, MISSOURI, A CORPORATION OF NEW JERSEY.

RAILWAY MOTOR TRUCK.

Application filed December 30, 1926. Serial No. 158,059.

My invention relates to railway rolling stock and consists in an improved car truck construction particularly adapted for trucks for use with electric motors on heavy interurban service.

The main object of my invention is to provide adequate elements on the truck frame for supporting the end of the motor frame spaced from the axle to which the motor is connected.

In addition to providing improved elements for normally supporting the motor, I desire to provide additional supporting elements adapted to function in the event of failure of the normal support.

A further object of my invention is to provide all of the supporting elements integral with a transom of the truck and preferably as part of a one-piece casting including other elements of the truck frame.

In the accompanying drawings which illustrate a selected embodiment of my invention—

Figure 1 is a longitudinal vertical section taken through a four wheel motor truck, the right hand and left hand portions adjacent the transoms being taken substantially along the lines a—a and b—b respectively of Figure 3.

Figure 2 is a horizontal section taken on line 2—2 of Figure 3.

Figure 3 is a transverse section taken on line 3—3 of Figure 1.

The truck includes the usual wheels 1 and axles 2, the journals of which carry the truck equalizers 3 which mount the truck frame through springs 4. The truck frame is preferably formed by a one-piece casting including wheel pieces 5 and transoms 6. Each transom 6 is shown as comprising a vertical web 7 with a top reinforcing flange 8 and a bottom reinforcing flange 9. Each transom increases in depth from its ends toward its center portion and at the center portion lower flange 9 forms the bottom wall of a lateral projection of box cross section adapted to form seats for the motor mounting springs 10 and 11.

The top wall 12 of the projection is shown as mounting four springs 10 which carry a spring plate 13 and a yoke 14. The motor housing 15 has a central lug 16 resting upon spring plate 13 and held against upward movement therefrom by the yoke 14. The yoke bolts 17 are yieldingly retained by springs 11.

At each end of the boxshaped projection are upstanding ribs 18 terminating in laterally projecting shelves 19 and the motor housing 15 is provided with suitable lugs 20 which overlie shelves 19 and in the event of failure of any of the elements normally supporting the motor through the central lug 16, one or both of the side lugs 20 will be engaged by the corresponding shelf or shelves 19, limiting the downward movement of the housing.

Both projections 9—12 and shelf 19 extend laterally from web 7 beyond the edge of the top flange 8 and this greater lateral projection of the motor supporting elements facilitates the application and removal of springs 10 and bolts 17 and 21. If the holes through which these bolts pass are slightly enlarged, the bolts may be inclined from the vertical sufficiently to move lengthwise past the top flange 8 on the transom.

Obviously the details of my invention may be varied without departing from the principle thereof, and I contemplate such modifications in the detail structure as are included in the scope of my claims.

I claim:

1. A car truck transom member comprising a vertical web and a box-shaped projection extending along the lower portion of said web.

2. A car truck transom member comprising a vertical web and a box-shaped projection extending along the lower portion of said web, there being a lateral shelf on said web at a higher level than said projection.

3. A car truck transom member comprising a vertical web with a reinforcing flange along the top edge thereof and a box-shaped motor supporting projection along the lower edge thereof extending laterally beyond the outer edge of said reinforcing flange.

4. A transom member for a car truck comprising a vertical web with an integral lateral projection along its lower portion, said projection being box-shaped in cross section.

5. A transom member for a car truck comprising a vertical web with an integral lateral projection along its lower portion, said projection being box-shaped in cross section and the lower portion of said projection extending longitudinally of the transom beyond the top and one side wall thereof to form a reinforcing flange for the transom throughout its length.

6. In a car truck, wheel pieces, a transom connecting said wheel pieces and increasing in depth toward its center, there being a reinforcing flange throughout the bottom of said transom from end to end, and motor supporting projections on said transom at different levels adjacent to the deepest portion of the transom.

7. In a car truck, wheel pieces, spaced transoms connecting said wheel pieces and each increasing in depth from said wheel pieces toward its center, there being reinforcing flanges along the tops and bottoms of said transoms from end to end, and motor supporting projections on said transoms at different levels between said flanges at the deepest portion of said transom, all of said elements being formed integrally in a one-piece casting.

8. In a car truck, a frame including a transom comprising a vertical web having a box-shape projection along its lower portion, a spring seated on said projection, and a motor housing having a lug at one end supported on said spring.

9. In a car truck, a frame including a transom comprising a vertical web having a box-shape projection along its lower portion, springs seated respectively on the upper and lower walls of said projection, and a motor housing supported by the spring seated on the upper wall of said projection, said housing being held against upward movement by the spring seated on the lower wall of said projection.

10. In a car truck, a frame including a transom having a vertical web and a lateral projection extending along the lower portion of said web, and an integral shelf on said web near each end of said projection and above the level thereof, a spring seated on said projection, a motor housing having a lug supported on said spring and having another lug extending over said shelf but normally spaced above the same.

11. In a car truck, a frame including a transom comprising a vertical web with a lateral projection along the lower portion thereof, springs seated on said projection and carrying a spring plate, a motor housing having a lug mounted upon said spring plate, a yoke extending over said lugs and resting upon said spring plate, bolts extending through said yoke, plate, springs, and projection and extending below the latter, and springs compressed between the lower ends of said bolt and the lower face of said projection.

In testimony whereof I hereunto affix my signature this 24th day of December, 1926.

EINAR G. HALLQUIST.